No. 772,941. PATENTED OCT. 25, 1904.
J. H. & D. E. KEFAUVER.
LIME DISTRIBUTER.
APPLICATION FILED JUNE 27, 1904.
NO MODEL. 5 SHEETS—SHEET 2.

Witnesses
T. P. Britt
E. C. Duffy

Inventors
J. H. Kefauver
and D. E. Kefauver
By
O. E. Duffy
Attorneys

No. 772,941. PATENTED OCT. 25, 1904.
J. H. & D. E. KEFAUVER.
LIME DISTRIBUTER.
APPLICATION FILED JUNE 27, 1904.
NO MODEL. 5 SHEETS—SHEET 4.

Witnesses
T. P. Britt
E. C. Duffy

Inventors
J. H. Kefauver
D. E. Kefauver
By O. E. Duffy
Attorneys

No. 772,941. PATENTED OCT. 25, 1904.
J. H. & D. E. KEFAUVER.
LIME DISTRIBUTER.
APPLICATION FILED JUNE 27, 1904.
NO MODEL. 5 SHEETS—SHEET 5.
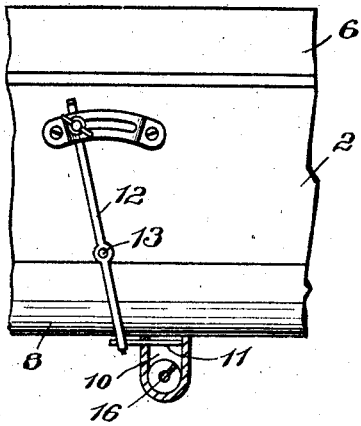
Fig. 7.
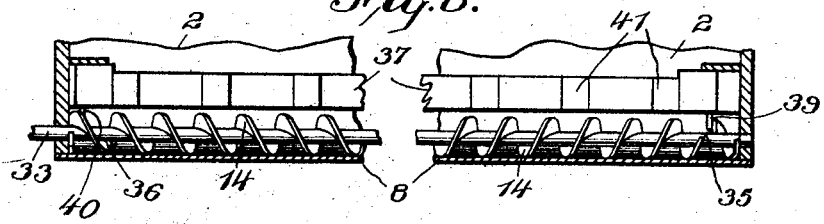
Fig. 8.
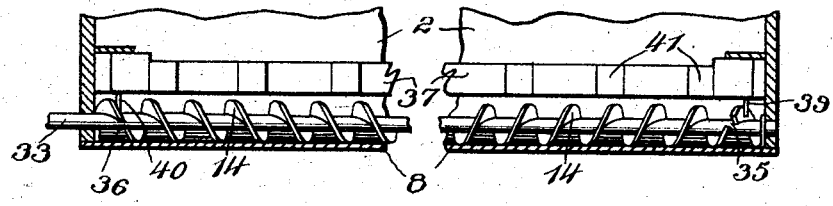
Fig. 9.
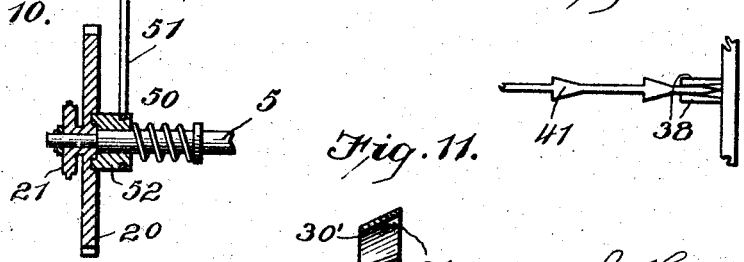
Fig. 10. Fig. 12. Fig. 11.
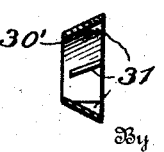
Witnesses
T. P. Britt
E. E. Duffy
Inventors
J. H. Kefauver
D. E. Kefauver
By
Attorneys No. 772,941. Patented October 25, 1904.

UNITED STATES PATENT OFFICE.

JOSEPH HOLLIN KEFAUVER AND DANIEL EDWARD KEFAUVER, OF MIDDLETOWN, MARYLAND.

LIME-DISTRIBUTER.

SPECIFICATION forming part of Letters Patent No. 772,941, dated October 25, 1904.

Application filed June 27, 1904. Serial No. 214,347. (No model.)

*To all whom it may concern:*

Be it known that we, JOSEPH HOLLIN KEFAUVER and DANIEL EDWARD KEFAUVER, citizens of the United States, residing at Middletown, in the county of Frederick and State of Maryland, have invented certain new and useful Improvements in Lime-Distributers; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to lime-distributers, and has for its object to provide a device of this class which will effectually distribute lime or the like in a simple and in an efficient manner.

A further object of our invention is to provide a lime-distributer in connection with a roller which will distribute lime, but which will prevent the same from being thrown in the air.

A further object of our invention is to provide a lime-distributer which will effectually pulverize the lime before distributing the same.

With these objects in view our invention consists in the novel manner of feeding the lime from the hopper.

Our invention also consists in the novel means of feeding the lime from the hopper to the distributing device.

Our invention also consists in the novel distributing device.

Our invention also consists in the novel arrangement of the screw feed mechanism in connection with the blower.

Our invention also consists in the novel construction of the rollers and also in other novel details and in combinations of parts, which will be first fully described, and afterward specifically pointed out in the appended claims.

Figure 1:
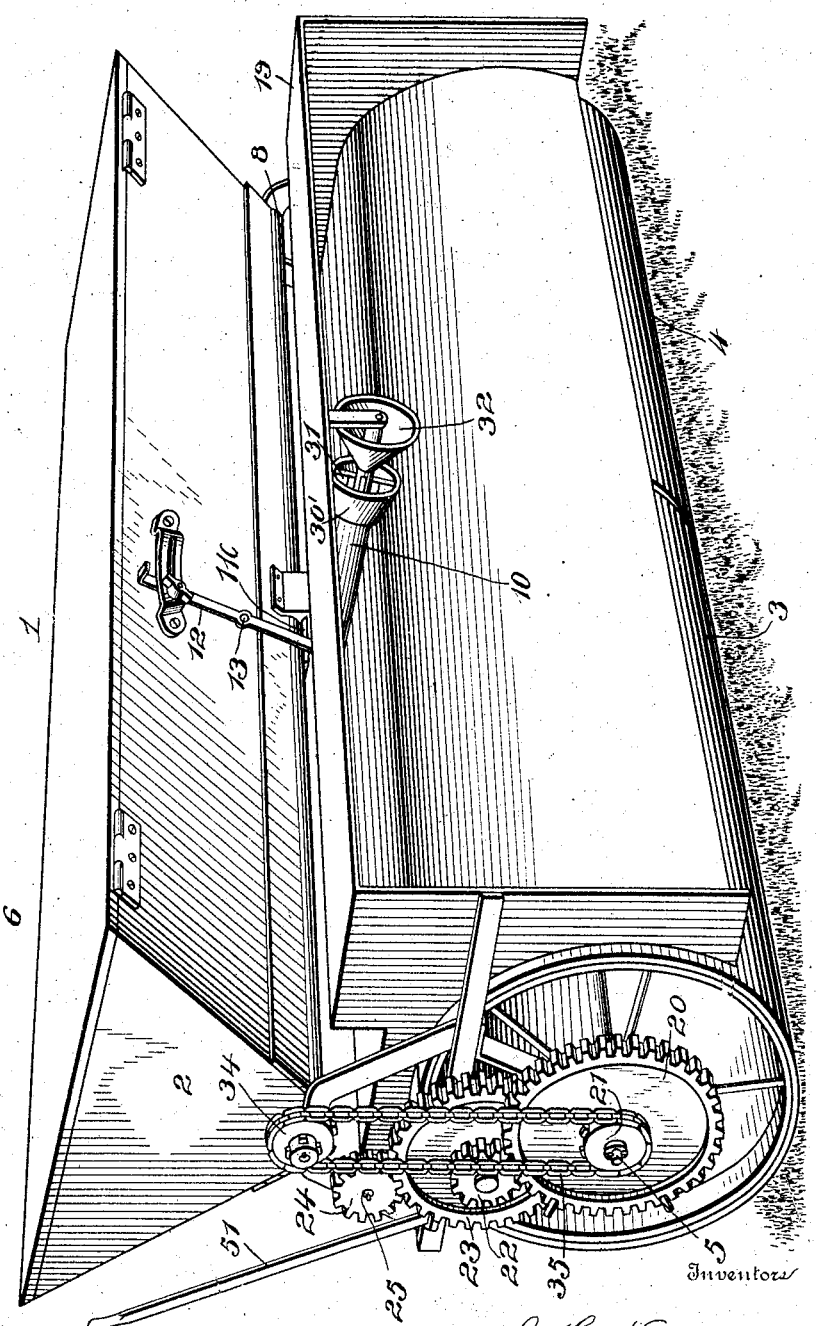
Figure 2:
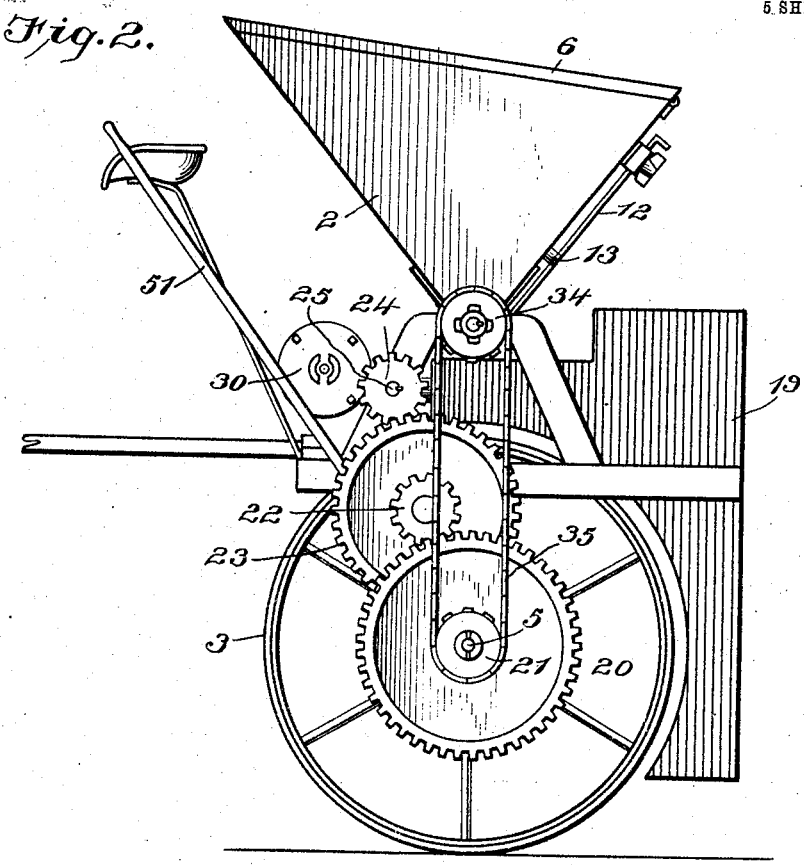
Figure 3:
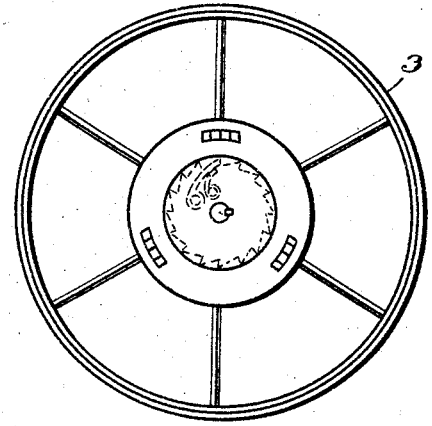
Figure 4:
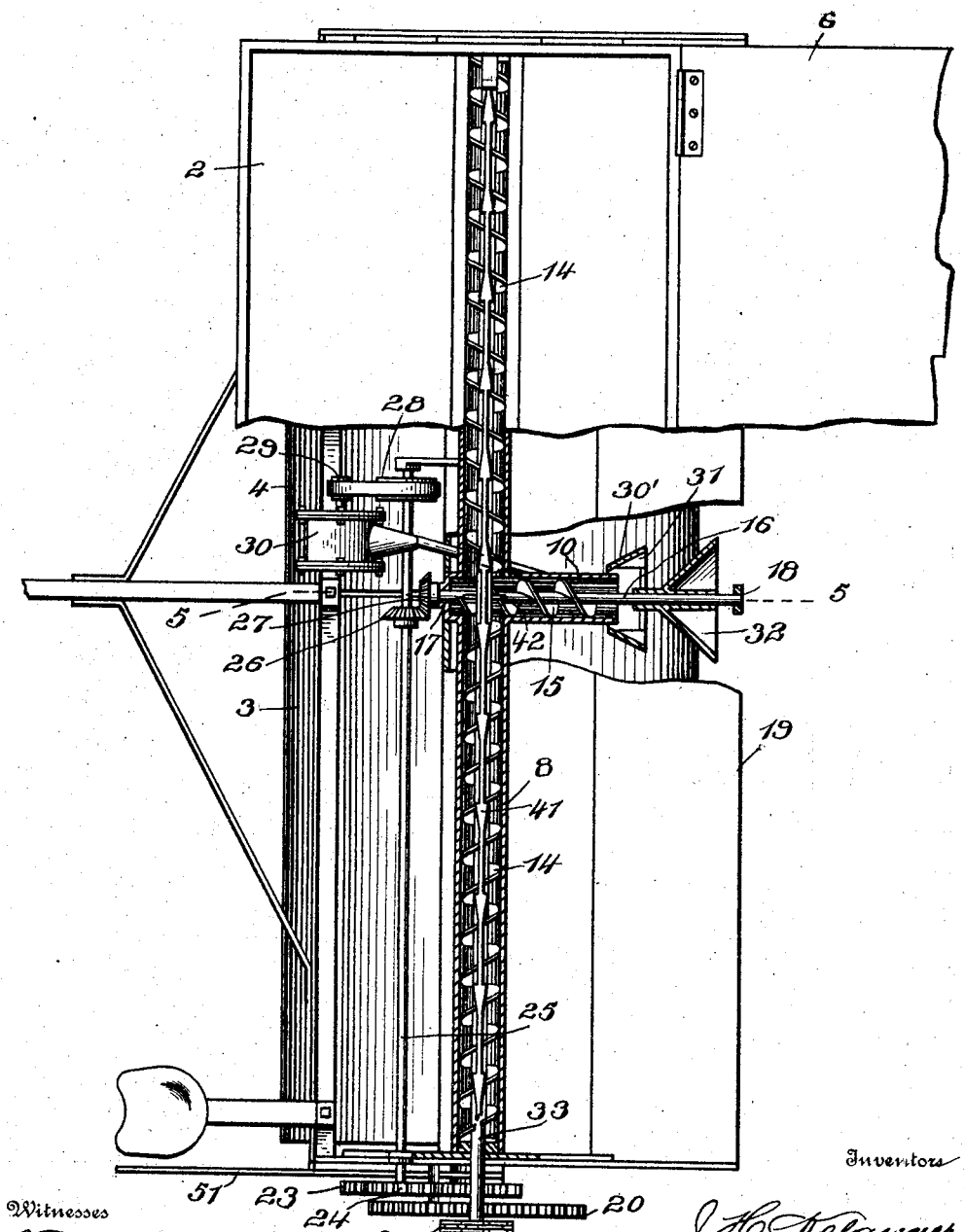
Figure 5:
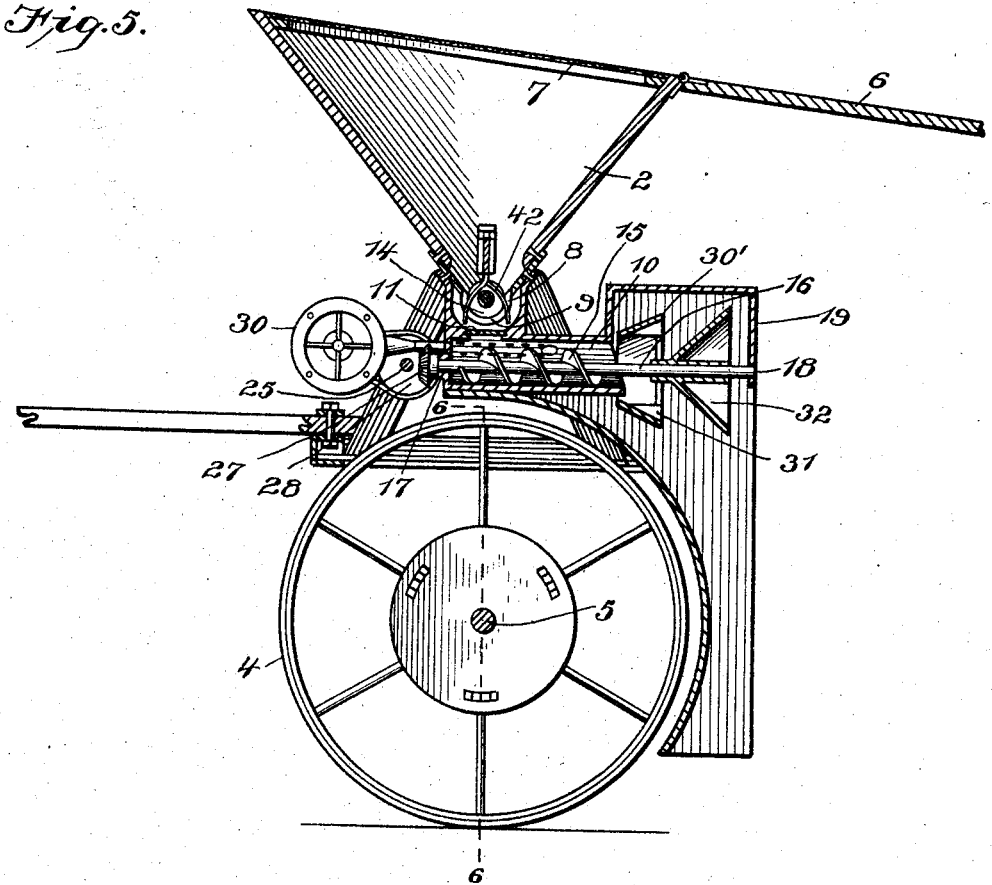
Figure 6:
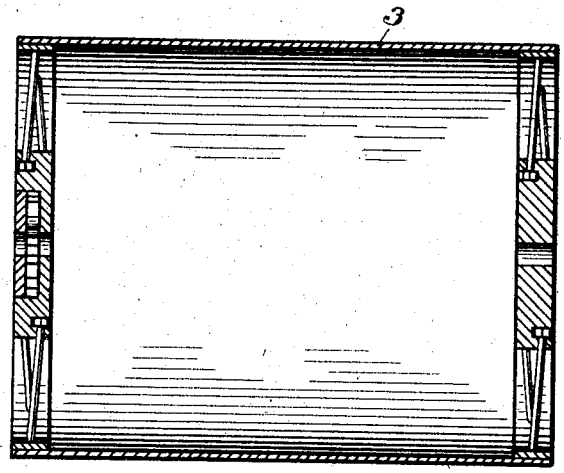

Referring to the accompanying drawings, Figure 1 is a perspective view of the lime-distributer, the extreme rear portion of the hood being removed in order to illustrate the distributing device. Fig. 2 is a side elevation of the distributer, showing the gearing mechanism. Fig. 3 is a side elevation of one of the rollers, showing the ratchet-and-pawl mechanism in dotted lines. Fig. 4 is a plan view, partly in section, of the distributer, showing a portion of the hopper broken away. Fig. 5 is a vertical transverse section taken on line 5 5 of Fig. 4. Fig. 6 is a vertical longitudinal section through one of the rollers, taken on line 6 6 of Fig. 5. Fig. 7 is a detail view of a portion of the hopper, showing the regulating slide and lever for operating the same. Fig. 8 is a vertical longitudinal section through the hopper, showing the double-screw feed in detail and illustrating the means for operating the agitator thereby. Fig. 9 is a similar view showing the agitator in a somewhat different position. Fig. 10 is a sectional view showing the clutch mechanism between the roller and the driving mechanism. Fig. 11 is a vertical section through the cone-shaped distributer; and Fig. 12 is a top plan of a portion of the agitator, showing the same in detail.

Like numerals of reference indicate the same parts throughout the several figures, in which—

1 indicates the distributer, which is composed of the hopper 2 and two rollers 3 and 4, said rollers being loosely journaled on the shaft 5 and are connected thereto by a ratchet-and-pawl mechanism, as shown in dotted lines in Fig. 3, so that the machine when turning will not bind or slide, the ratchet-and-pawl arrangement providing for one roller revolving in one direction without driving the shaft 5, while the other roller will revolve in the opposite direction and drive the shaft 5, this expedient, of course, being well known in similar devices.

6 indicates a cover for the hopper 2, and shown in Fig. 5 said cover is thrown back, the top of the hopper being so inclined that a screen 7 can be fitted over the mouth of the hopper, whereby the lime may be shoveled directly on said screen and the lime properly screened, the large lumps passing off of the screen and over the cover 6.

The hopper 2 is preferably shaped as shown in Fig. 5 and is provided with a substantially semicircular portion 8 at the bottom, an opening 9 being formed in the center of said portion 8, through which the lime is adapted to pass from the hopper 2 into the chamber 10. Said chamber 10 is located at right angles to the semicircular portion 8, and a regulating-slide 11 is adapted to be moved across said opening 9 to cover the same either wholly or partially in order to regulate the amount of lime passing from the hopper 2. A suitable regulating-lever 12, fulcrumed to the hopper at 13, is provided, as shown in Fig. 7 and also in Fig. 1, so that the quantity of lime passing into the distributer can be accurately regulated.

Located within the semicircular chamber 8 at the bottom of the hopper 2 is a double-screw feed 14, as shown in Fig. 4 and in detail in Figs. 8 and 9, said screw being so arranged that when it is revolved the lime in the hopper will be fed from both sides thereof to and into the central opening 9 in the semicircular chamber 8. The distributing-chamber 10 is, as aforesaid, located at right angles to the semicircular chamber 8, and a screw feed 15 is located therein, having a shaft 16, which is journaled at 17 and also at 18 in the rear of the hood 19. The hood 19 is, as shown in Fig. 1, arranged so as to cover the distributing mechanism, and the sides of said hood extend down to within a few inches of the ground, so that when the lime is distributed it is not possible that the wind will take the same and scatter it broadcast. A suitable rear wall of canvas or other material effectually covers and forms the rear wall of the hood, said cover of canvas not being shown in Fig. 1. It is, however, secured in any suitable manner to the top and sides of the hood.

Referring now to Figs. 1 and 2, it will be seen that the driving-shaft 5 carries a large gear-wheel 20 and a small sprocket-wheel 21, said gear-wheel 20 meshing with a pinion 22, which pinion is connected to a gear-wheel 23, which drives a small pinion 24, carried on a shaft 25. Referring to Fig. 4, it will be seen that a small bevel-gear 26 is carried on said shaft 25, which meshes with a small bevel-gear 27 on the screw feed-shaft 16 in order to revolve said shaft and screw. A small pulley 28 is also secured to the end of the shaft 25, which pulley is belted to a small pulley 29 to operate the blower 30, and, as shown in Fig. 4 and also in Fig. 5, the blast from said blower is led into the screw feed-chamber 10 for a purpose which will be hereinafter fully described.

Secured to the screw feed-shaft 16 is a cone-shaped distributer 30′, which is provided with a series of oblique ribs 31, as shown in Fig. 11, and secured also on said shaft 16 in rear of said distributer is a cone 32, which is located and arranged as shown for a purpose which will be presently described.

Referring to Figs. 4, 8, and 9, it will be seen that the double-screw feed 14 in the semicircular chamber 8 at the bottom of the hopper is journaled at each end of the said chamber 8, the shaft 33 of said screw carrying the small sprocket-wheel 34, over which a chain 35 passes, said chain also passing over the sprocket 21, which is carried on the driving-shaft 5. It will also be seen that the extreme ends of the screw 14 are provided with a break 35 at one end and a similar break 36 at the other. The agitator 37, which is located directly above the said double screw and guided between two vertical walls 38, located at both ends of the hopper, is provided with two downwardly-projecting pins 39 and 40, as shown in Figs. 8 and 9, which pins are engaged by the double screw 14, as clearly shown, and as said screw revolves the screw engages the said pins 38 and 39 and reciprocates the same, so that as said screw revolves in the lime in the hopper the agitator is reciprocated within the lime, and it will be seen by referring to Figs. 4 and 12 that the said agitator is provided with a series of projections 41 thereon, the flat faces thereof engaging the lime and working the same toward the center of the distributer and toward the central opening therein. Secured to said distributer, as shown in Fig. 5, are two downwardly-projecting prongs 42, which extend on either side of the double-screw feed just above the central opening in the semicircular chamber 8, the purpose of these prongs being to prevent the lime from clogging within the opening and to insure a uniform passage of the lime from the hopper into the screw-feed distributing-chamber 10.

A suitable clutch arrangement 50, operated by a lever 51, is carried on the driving-shaft 5, so that the distributing mechanism can be disconnected from the driving-shaft and rollers whenever desired.

Having thus set forth the several parts of our invention, its operation is as follows: The screen 7 is placed in the mouth of the hopper, as shown in Fig. 5, and the lime is thrown upon said screen, the large lumps passing down and over the cover 6. When the hopper is filled and the machine is in operation, the rollers revolve the shaft 5, and by means of the gearing before described the fan or blower 30 is put in operation. The worm-screw feed 10 is revolved, and the double worm-screw 14 is put in motion within the hopper. By reason of the double screw 14 the lime is fed from both sides of the hopper toward the center, and as the ends of the said double screw engage alternately the pins 39, Fig. 8, of the agitator 37 the lime in proximity to the double screw 14 is agitated and is also carried toward the center by said agitator on account of the shoulders 41 on the agitator. The lime is thus carried to the central opening in the hopper and into the cylinder 10, where it is carried by the worm-screw 15, the blast from the fan or blower entering the said cylinder 10. All fine particles of the lime is blown out of the said cylinder, passing through the distributer 30' and striking against the revolving cone 32 and then thrown in every direction within the hood 19. The larger lumps of lime are fed by the screw 15 in the distributer 30' and are thrown by said distributer in every direction within the hood 19, the oblique ribs 31 in said distributer 30' assisting to force the lime from the distributer as said distributer rapidly revolves.

It will be noted by referring to Fig. 5 that the rear journal of the screw-shaft 16 is protected from the lime by the cone 32.

In order to disengage the distributing mechanism from the rollers, the lever 51 is operated, which throws the clutch member 52 out of engagement with the gear-wheel 20, so that the machine can then be used as a roller without distributing the lime or operating the distributing mechanism.

Having thus described the operation of our invention, we do not wish to be understood as limiting ourselves to the exact construction as herein set forth, as various slight changes may be made therein which would fall within the limit and scope of our invention, and we consider ourselves clearly entitled to all such changes and modifications.

What we claim as our invention, and desire to secure by Letters Patent of the United States, is—

1. In a lime-distributer comprising suitable rollers, a hopper to receive the lime, a screw feed in said hopper, a screw distributer below said hopper, substantially as described.

2. In a lime-distributer, the combination with a hopper, of a screw feed within said hopper, a distributing-screw below said hopper and a cone-shaped distributer carried by said distributing-screw, substantially as described.

3. In a lime-distributer, the combination of a hopper, a screw feed below said hopper, a cone-shaped distributer carried by said screw feed, and a cone carried by said screw feed against which the lime is forced, substantially as described.

4. In a lime-distributer, the combination of a hopper, a screw feed below said hopper and a cylinder around said screw feed, a blower leading into said cylinder and a distributer carried on said screw feed, substantially as described.

5. In a lime-distributer, the combination of a hopper, a screw feed therein and a distributer adapted to be engaged by said screw feed and operated thereby, and means for distributing the lime passing from said hopper, substantially as described.

6. In a lime-distributer, the combination of a hopper, a suitable screw feed within said hopper, an agitator adapted to be engaged and operated by said screw feed and means for distributing the lime passing over the said hopper, substantially as described.

7. In a lime-distributer, the combination of a hopper, a screw feed within said hopper, a distributer within said hopper and means on said distributer for assisting the said screw feed to feed the lime, and means for distributing the lime passing over said hopper, substantially as described.

8. In a lime-distributer, the combination of a hopper, a screw feed therein, an agitator within said hopper, a distributing screw feed below said hopper to distribute the lime, substantially as described.

In witness whereof we affix our signatures in presence of two witnesses.

JOSEPH HOLLIN KEFAUVER.
DANIEL EDWARD KEFAUVER.

Witnesses:
L. T. ROUTZAHN,
JOHN L. ROUTZAHN.